UNITED STATES PATENT OFFICE.

MAX JUNGHANDEL, OF SAN FRANCISCO, CALIFORNIA.

COMPOSITION OF MATTER FOR USE IN MAKING ARTIFICIAL STONE.

1,363,879.     Specification of Letters Patent.    Patented Dec. 28, 1920.

No Drawing.     Application filed August 11, 1919. Serial No. 316,588.

*To all whom it may concern:*

Be it known that I, MAX JUNGHANDEL, having declared my intention to become a citizen of the United States, residing at San Francisco, in the county of San Francisco, State of California, have invented certain new and useful Improvements in Composition of Matter for Use in Making Artificial Stone, of which the following is a description.

My invention relates to a composition of matter for use in making artificial stone and has for its object to provide a composition of matter for this purpose which will be inexpensive and can be readily cast or molded into slabs or blocks, will be relatively light in weight, will be durable, will have high fire retarding qualities, will have high insulating qualities as regards heat, cold and sound, will set and harden uniformly throughout the mass with more than usual rapidity and without liability to distortion or surface cracking, and will be free from liability to injury from the expansion and contraction due to changes of temperature.

With the above explained objects and other objects hereinafter explained in view my invention consists in the composition of matter hereinafter described and claimed.

In the manufacture of artificial stone particularly in the form of slabs or blocks it is usual to mix the cement which forms the basis of the mixture with sand or gravel or both sand and gravel as aggregate and to pour or cast the mixture with, of course, water enough to make a mixture of the proper consistency into molds. Sand and gravel are rigid and unyielding materials and do not present surfaces to which either air or any considerable amount of water will cling so that they do not carry into the mass any air and carry comparatively little water. In the process of setting and hardening the cement takes up water and expands and, as the aggregate is rigid and incompressible, the expansion is not taken up within the mass but causes the slab or block as a whole to expand. This expansion in the process of setting and hardening is, in the case of slabs or blocks of any considerable size, so great that it forces the sides of the mold outward or, if the sides of the mold are rigidly held against outward movement, causes the slab or block to buckle or become distorted and cracked. Sand or gravel as aggregate forms a solid mass throughout in the interior of which the process of setting and hardening proceeds much more slowly than it does at and near the surface so that in slabs or blocks of any considerably thickness there is great liability to surface cracking. The completed slab or block being solid and unyielding throughout its mass, the expansion and contraction due to changes in temperature is not taken up interiorly and the result is cracking of the slab or block.

These difficulties in the use of cement with a rigid aggregate such as sand or gravel are overcome by the use of the composition of my invention. I use instead of the rigid, inelastic, unyielding aggregate an aggregate which is elastic and yielding due in part to the character of the material used and in part to its form. The material which I find particularly desirable is the hulls of rice. Rice hulls are largely composed of silica, and other inorganic material and are of capsular form and when once thoroughly dried tend to retain this form and even when broken up by grinding the pieces tend to retain their original form and if distorted by pressure tend to spring back into their original form. Even when calcined the pieces of the hulls retain to a very considerable extent both their form and their elasticity. These characteristics of elasticity and form are possessed to a greater or less degree by the hulls of other grains, by the husks of cocoa and coffee and by many seeds as well as by small sea-shells, all of which are more or less well adapted for use as an aggregate in the composition of my invention.

In making up the composition of my invention I take any good cement such as Portland, Roman, oxy-chlorid or other cement and mix with it rice hulls, preferably ground or calcined, or other of the above described elastic, capsular materials, in such proportions that the mixture will contain from 30 to 80 per cent. of such aggregate, adding sufficient water to make the mixture of the proper consistency. The composition thus prepared is poured or cast in molds of suitable shape and size, the portion of the mold against which the face of the slab or block is formed being preferably of glass if a smooth finish is desired, and the composition is allowed to set and harden.

The elastic, capsular material above described when used as aggregate in proper proportions absorbs by its elasticity the expansion due to the recrystallization of the cement in setting and hardening so that a slab cast as above described in a rigid mold of definite dimensions will not expand to such an extent as to cause buckling or cracking or to force the sides of the mold outward.

The rice hulls or other above described elastic, capsular material by reason of the concave form and large surface presented by the pieces or fragments of which it is made up carries with it into the mixture more or less finely divided air and also considerable water both of which aid materially in causing the cement to set uniformly throughout the mass so that the cement in the interior sets and hardens nearly or quite as rapidly as on or near the surface thus preventing any tendency to surface cracking or checking. More or less of the air carried into the mass by the particles of the elastic, capsular material remains forming minute cells which are non-conducting and aid in rendering the slab or block a good insulator as regards sound as well as heat and cold.

The rice hulls or other described material being largely composed of inorganic material is hard and durable and even if not calcined is highly fire resistant. If calcined it is still more highly fire resistant as it contains nothing which will burn. The slab or block made of my composition as above described will not crack from the expansion and contraction due to changes in temperature as the aggregate retains sufficient of its elasticity to take up the expansion and permit of the contraction without injury.

While the composition of my invention is particularly adapted for use in making slabs or blocks for use in flooring or in side walls it is equally well adapted for use in making the walls of houses or other structures.

Rice and other grain hulls being of no practical value for other uses are very inexpensive. They are also of very light weight so that used as aggregate the product is relatively very light as compared with the product made with sand or gravel.

Having thus described my invention what I claim is:

1. The herein described composition of matter for use in making artificial stone consisting essentially of cement and an aggregate of elastic, capsular material.

2. The herein described composition of matter for use in making artificial stone consisting essentially of cement and an aggregate of rice hulls.

3. The herein described composition of matter for use in making artificial stone consisting essentially of cement and an aggregate of fragments of rice hulls.

4. The herein described composition of matter for use in making artificial stone consisting essentially of cement and an aggregate of calcined rice hulls.

In testimony whereof I affix my signature this second day of August, 1919.

MAX JUNGHANDEL.